(12) United States Patent
Huang et al.

(10) Patent No.: US 8,261,501 B2
(45) Date of Patent: Sep. 11, 2012

(54) CONNECTOR FOR CONNECTING OUTER PLATE OF SIDE PANELS AND OUTER CORNER POST OF CONTAINER BODY AND CONTAINER BODY OF REFRIGERATED AND THERMAL VEHICLE

(75) Inventors: Tianhua Huang, Qingdao (CN); Robert Wang, Qingdao (CN); Ryan Xu, Qingdao (CN); Jack Zhang, Qingdao (CN)

(73) Assignee: China International Marine Containers (Group) Ltd., Shenzhen, Guangdong (CN)

( * ) Notice: Subject to any disclaimer, the term of this patent is extended or adjusted under 35 U.S.C. 154(b) by 338 days.

(21) Appl. No.: 12/577,914

(22) Filed: Oct. 13, 2009

(65) Prior Publication Data

US 2010/0212248 A1   Aug. 26, 2010

(30) Foreign Application Priority Data

Feb. 20, 2009 (CN) ................. 2009 2 0009963 U

(51) Int. Cl.
*F16B 9/00* (2006.01)
*F16B 7/00* (2006.01)
*F16B 21/08* (2006.01)
*F16B 12/46* (2006.01)
*B25G 3/08* (2006.01)
*B60P 3/20* (2006.01)
*B62D 27/00* (2006.01)
*F25D 19/00* (2006.01)
*E04B 1/00* (2006.01)
*E04C 3/00* (2006.01)

(52) U.S. Cl. ............ 52/277; 52/465; 403/188; 403/295; 403/382; 403/397; 403/403; 296/24.35; 296/29; 62/298

(58) Field of Classification Search ............ 52/277, 52/465; 403/188, 295, 382, 329, 397, 403; 296/29, 191, 24.35; 62/298
See application file for complete search history.

(56) References Cited

U.S. PATENT DOCUMENTS

| | | | | |
|---|---|---|---|---|
| 3,229,438 A * | 1/1966 | Flagan | .......................... | 52/588.1 |
| 3,693,306 A * | 9/1972 | Heinz et al. | ................... | 52/287.1 |
| 4,385,850 A * | 5/1983 | Bobath | .......................... | 403/205 |
| 4,662,138 A * | 5/1987 | Bryant | .......................... | 52/282.4 |
| 4,714,367 A * | 12/1987 | Baus | .............................. | 403/104 |
| 4,754,587 A * | 7/1988 | Glaser | ............................ | 52/282.4 |
| 4,923,076 A * | 5/1990 | Weiss et al. | .................... | 220/1.5 |
| 4,936,065 A * | 6/1990 | Hutchinson | ...................... | 52/235 |
| 2005/0053429 A1 * | 3/2005 | Davidsaver et al. | .......... | 405/284 |

* cited by examiner

*Primary Examiner* — Brian Glessner
*Assistant Examiner* — Omar Hijaz
(74) *Attorney, Agent, or Firm* — Workman Nydegger

(57) ABSTRACT

A connector for connecting an outer plate of side panels and an outer corner post of a container body comprises a connecting plate for connecting the outer plate and the outer corner post of the container body and a cover plate. The connecting plate is perpendicularly provided with a strengthening stop plate at an inner side of a middle portion thereof and a stop groove for receiving the outer plate at an outer side of the middle portion thereof, and provided with a seat plate parallel to a base plate of the stop groove at an end thereof connecting the outer corner post. Two clipping strips are symmetrically provided on opposite sides of the seat plate and the base plate of the stop groove. The cover plate is provided with two elastic clipping strips which respectively engage with the two clipping strips and have a hook-shape cross section.

10 Claims, 3 Drawing Sheets

CONNECTOR FOR CONNECTING OUTER PLATE OF SIDE PANELS AND OUTER CORNER POST OF CONTAINER BODY AND CONTAINER BODY OF REFRIGERATED AND THERMAL VEHICLE

CROSS REFERENCE TO RELATED APPLICATIONS

The present application claims a priority to Chinese patent application No. 200920009963.2 filed on Feb. 20, 2009, which is herein incorporated by reference in entirety thereof.

FIELD OF THE INVENTION

The present invention relates to a connector for connecting an outer plate of side panels and an outer corner post of a container body of a refrigerated and thermal container or a van, and a container body structure of a refrigerated and thermal vehicle.

BACKGROUND OF THE INVENTION

Current container body of an aluminum refrigerated or thermal semi-trailer, or a refrigerated or thermal freight container comprises a floor, a front wall mounted on the floor, a rear door frame with a rear door, a left side panel, and a right side panel. Since the two side panels, the front wall or the rear door frame themselves are mostly connected with a mechanical automatic riveting process, the rivet has good formation and does not easily loosen and does not easily leak water. However, since the connection between components is just performed by a manual riveter, there is a problem that the rivet herein has a bad formation, easily loosens, makes the connection unsecure, and affects the appearance. In particular, at the places where the front end and the rear end of the outer plate are connected with the front corner post and the rear corner post, such problem is most prominent. The side panels as a structure of the container body of a refrigerated semi-trailer or refrigerated freight container comprises an outer plate, an inner plate and a heat preservation layer clamped between the outer plate and the inner plate. Since a few retention plate phenomena will exist during the manufacture of the side panels, the pressure from a foaming mass during foaming process will cause the excessive deformation amount of the plates to release towards the open front or rear end of the side panels. Therefore, corrugated deformation most easily occurs at the front or rear end portion of the side panels. When the corrugated side panels are connected via rivets with the front corner post or the rear door corner post during assembling, the appearance is very poor, the connection is not secure, and thus heat preservation effect of the freight container will be affected.

BRIEF SUMMARY OF THE INVENTION

An object of the present invention is to provide a connector for connecting an outer plate of side panels and an outer corner post of a container body which may realize a firmly connection and have good appearance with respect to the above deficiencies in the prior art.

Another object of the present invention is to provide a container body of a refrigerated and thermal vehicle which has a good heat preservation effect with respect to the above deficiencies in the prior art.

In order to attain the above objects, the following technical solutions may be adopted according to the present invention.

According to the present invention, a connector for connecting an outer plate of side panels and an outer corner post of a container body may comprise: a connecting plate for connecting the outer plate and the outer corner post of the container body, perpendicularly provided with a strengthening stop plate at an inner side of a middle portion thereof, perpendicularly provided with a stop groove for receiving the outer plate at an outer side of the middle portion thereof, and provided with a seat plate in parallel with a base plate of the stop groove at an end thereof connecting the outer corner post, wherein two clipping strips are symmetrically provided on opposite sides of the seat plate and the base plate of the stop groove; and a cover plate provided with two elastic clipping strips which respectively engage with the two clipping strips and have a hook-shape cross section.

The strengthening stop plate may have an L-shape cross section.

The connecting plate may be provided with a strengthening rid at the end thereof connecting the outer plate.

According to the present invention, a container body of a refrigerated and thermal vehicle may comprise a connector for connecting an outer plate of side panels and an outer corner post. The connector may comprise: a connecting plate for connecting the outer plate and the outer corner post of the container body, perpendicularly provided with a strengthening stop plate at an inner side of a middle portion thereof, perpendicularly provided with a stop groove for receiving the outer plate at an outer side of the middle portion thereof, and provided with a seat plate in parallel with a base plate of the stop groove at an end thereof connecting the outer corner post, wherein two clipping strips are symmetrically provided on opposite sides of the seat plate and the base plate of the stop groove; and a cover plate provided with two elastic clipping strips which respectively engage with the two clipping strips and have a hook-shape cross section.

The advantages and the positive effects according to the connector for connecting the outer plate of side panels and the outer corner post of the container body are as follows. In the present invention, since the stop groove capable of blocking the outer plate and the strengthening plate capable of blocking most of the foaming material in the heat preservation layer of side panels are provided, the ends of the side panels almost become into a closed state, and corrugated deformation does not easily occur, and thus the connecting strength at this position is not affected. Therefore, through the connector of the present invention, the connection between the outer plate of side panels and the front wall corner post or the rear door frame corner post is very secure, and has a good appearance. Moreover, the connector of the present invention is also provided with the cover plate capable of being inlaid onto the connecting plate, so that the connecting rivet does not easily fall out, which further assures the connecting strength and may effectively prevent corrosion of the connecting rivet and may be beneficial to extend the service life.

The advantages and the positive effects according to the container body of the refrigerated and thermal vehicle of the present invention are as follows. Since the container body employs the connector for connecting the outer plate of side panels and the outer corner post according to the present invention, not only the connection is secure but also air tightness is good, which may effectively prevent heat exchange between inside and outside of the container body and thus heat preservation effect is good.

The above and other objects, features and advantages will be more apparent by way of the following description of preferred embodiments with reference to the drawings.

Figure 1:
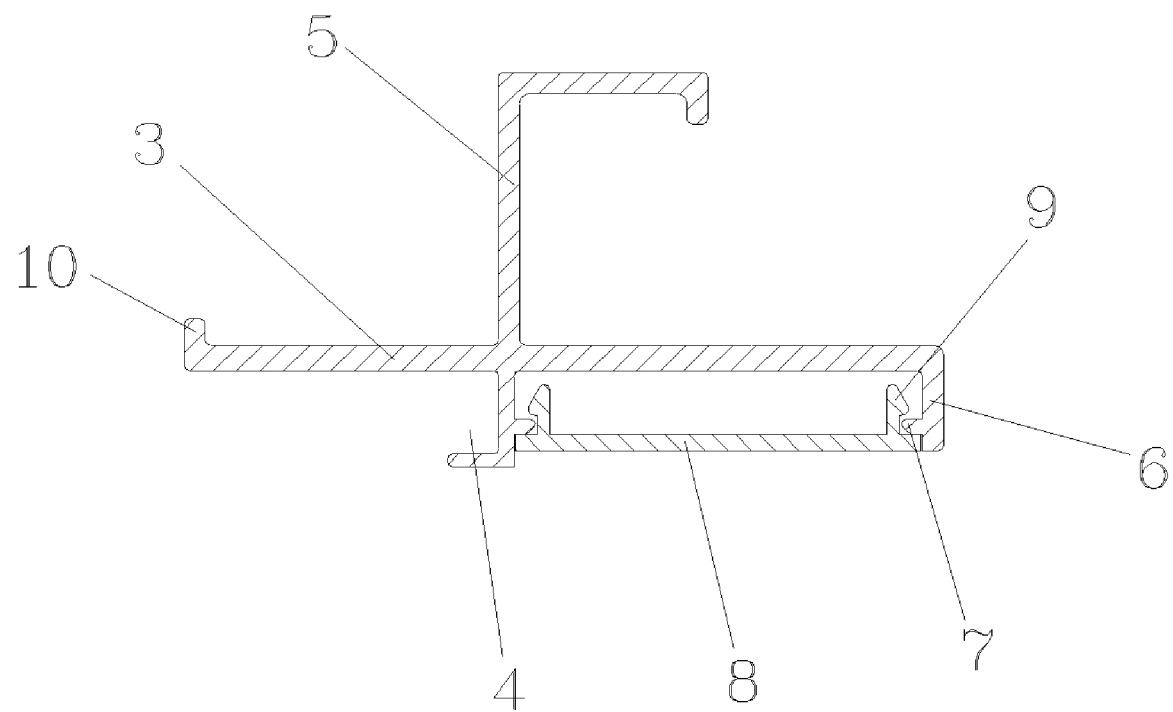
FIG. 1 is a structural diagram of a connector for connecting an outer plate of side panels and an outer corner post of a container body according to the present invention.

The relevant reference numbers are explained as follows. Herein, the reference number 1 indicates an outer plate, the reference number 3 indicates a connecting plate, the reference number 4 indicates a stop groove, the reference number 5 indicates a strengthening stop plate, the reference number 6 indicates a seat plate, the reference number 7 indicates clipping strips, the reference number 8 indicates a cover plate, the reference number 9 indicates elastic clipping strips, the reference number 10 indicates a strengthening rib, the reference number 11 indicates a solid rivet, the reference number 12 indicates a front wall outer corner post, the reference number 13 indicates a rivet, and the reference number 14 indicates a rear door frame corner post.

DETAILED DESCRIPTION OF THE INVENTION

Hereinafter, embodiments of the present invention will be described in details. It should be noted that the embodiments as set forth herein is only used for illustration, but not limiting the present invention.

As shown in FIG. 1, a connector for connecting an outer plate of side panels and an outer corner post of a container body according to the present invention comprises: a connecting plate 3 for connecting an outer plate 1 and an outer corner post of the container body, and a cover plate 8. A strengthening stop plate 5 is perpendicularly provided at an inner side (i.e. a side at a heat preservation layer of the side panels) of a middle portion of the connecting plate 3. The cross section of the strengthening stop plate 5 is L-shape or other shapes. A stop groove 4 for receiving the outer plate 1 is perpendicularly provided at an outer side of the middle portion of the connecting plate 3. A seat plate 6 in parallel with a base plate of the stop groove 4 is provided at an end of the connecting plate 3 connecting the corner post. Two clipping strips 7 are symmetrically arranged on opposite sides of the seat plate 6 and the base plate of the stop groove 4. The cover plate 8 is provided with two elastic clipping strips 9 which respectively engage with the two clipping strips 7 and have a hook-shape cross section. A strengthening rid 10 is formed at an end of the connecting plate 3 connecting the outer plate, so as to improve the strength of the connector.

Figure 2:
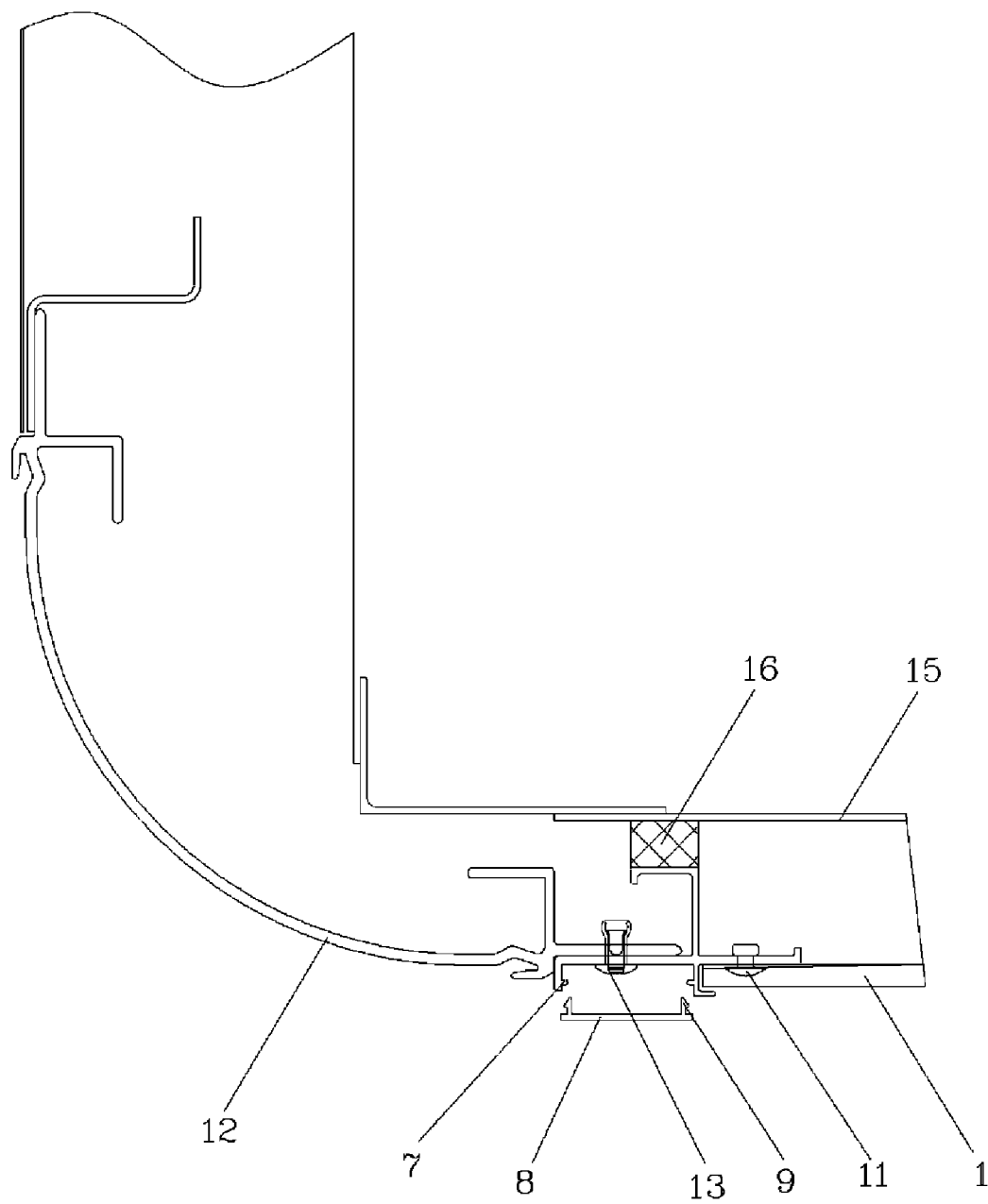
FIG. 2 is a structural diagram illustrating that an outer plate of side panels and a front wall outer corner post of a freight container are connected through the connector according to the present invention.

As shown in FIG. 2, by using the connector according to the present invention, an outer plate of side panels and a front wall outer corner post of a freight container through the connector are connected by the following steps of: first, by an auto-riveting machine, connecting one side of the connecting plate 3 with the outer plate 1 through a solid rivet 11, at the same time, connecting a top portion of the connector with a roof bow of the freight container and connecting a bottom portion of the connector with a floor bearer of the freight container via rivets; disposing a foaming mass 16 between top of the strengthening plate 5 and an inner plate 15 of the side panels, so as to support the inner plate 15 and assure to form an even end face at this end after the foaming material is foamed; after the foaming material of the heat preservation layer inside the side panels is foamed, connecting the other side of the connecting plate 3 with a front wall outer corner post 12 through a rivet 13, herein most of the foaming material is blocked by a side surface of the L-shape strengthening plate 5, and the rivet 13 may be a solid rivet or a blind rivet; aligning the elastic clipping strips 9 on the cover plate 8 with the clipping strips 7, and pressing the cover plate 8 onto the connecting plate 3, so as to prevent the rivet 13 connecting the front wall outer corner post 12 from falling out and also serve as waterproofness; and finally sealing the stop groove 4 and other corner positions with sealant, etc.

Figure 3:
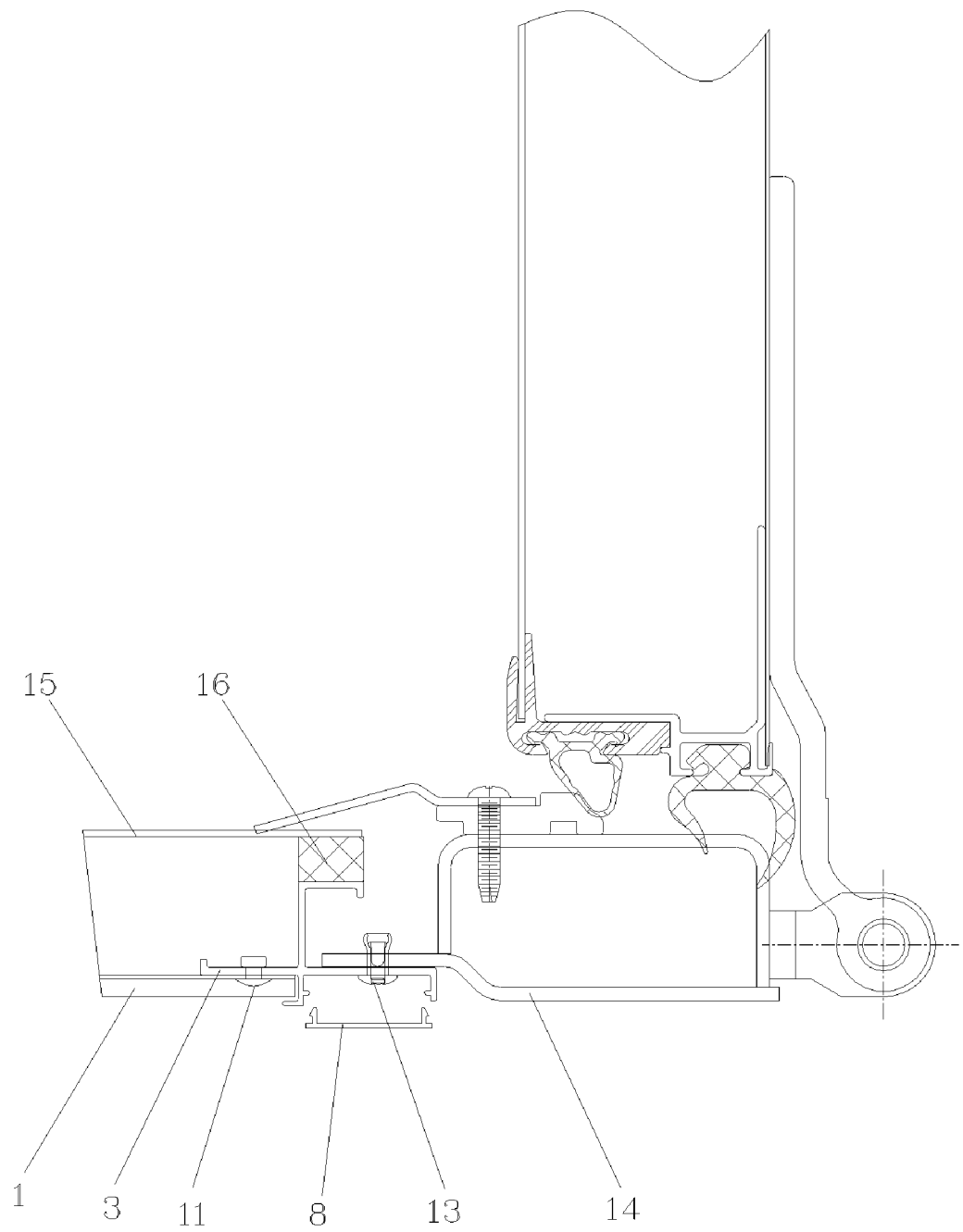
FIG. 3 is a structural diagram illustrating that an outer plate of side panels and a rear door frame outer corner post of a freight container are connected through the connector according to the present invention.

As shown in FIG. 3, the operation for connecting the outer plate of side panels of a freight container with a rear door frame corner post 14 of the freight container through the connector of the present invention is basically the same as that for connecting with the front wall outer corner post 12. Specifically, first, through the solid rivet 11, connecting the outer plate 1 of side panels with the connecting plate 3, at the same time, connecting the roof bow and the floor bearer of the freight container; after the foaming material of the heat preservation layer in the side panel is foamed, connecting the connecting plate 3 with the outer door frame corner post 14 through a rivet 13; pressing the cover plate 8 onto the connecting plate 3; and finally sealing the stop groove 4 and other corner positions.

In the present invention, the connector for connecting the outer plate of the side panels and the outer corner post of the container body is suitable to a container body of the refrigerated and thermal container, a carriage of thermal-refrigerated-dry cargo van-type transportation vehicle, general freight container, and other various types of container body.

As shown in FIG. 2 and FIG. 3, a container body structure of a refrigerated and thermal vehicle according to the present invention comprises a connector for connecting an outer plate of the side panels and an outer corner post of the container body. Herein the connector comprises a connecting plate 3 for connecting an outer plate 1 and an outer corner post of the container body, and a cover plate 8. A strengthening stop plate 5 is perpendicularly provided at an inner side of a middle portion of the connecting plate 3. A stop groove 4 for receiving the outer plate 1 is perpendicularly provided at an outer side of the middle portion of the connecting plate 3. A seat plate 6 in parallel with a base plate of the stop groove 4 is provided at an end of the connecting plate 3 connecting the corner post. Two clipping strips 7 are symmetrically arranged on opposite sides of the seat plate 6 and the base plate of the stop groove 4. The cover plate 8 is provided with two elastic clipping strips 9 which respectively engage with the two clipping strips 7 and have a hook-shape cross section. That is to say, the container body of the refrigerated and thermal vehicle employs the connector for connecting the outer plate of the side panels and the outer corner post of the container body as previously stated. As for the other structures of the refrigerated and thermal vehicle, such as floor, roof sheet, and so on, they are the same as those in the prior art, and detailed description thereof is omitted.

Although the present invention has been described with reference to the several typical embodiments, it should be understood that the terminology used herein is descriptive and illustrative, but not limitative. Since the present invention may be embodied in various forms without departing from the spirit or essentiality of the present invention, it should be understood that the above embodiments are not limited to any previous details and should be widely interpreted within the range of the spirit and the scope defined by the attached claims of the present invention, therefore all changes and variants falling within the claims and the equivalent scope thereof would be covered by the attached claims.

What is claimed is:

1. A container body of a refrigerated and thermal vehicle, comprising: a side panel including an inner plate and an outer plate; an outer corner post; and a connector connected to the outer plate and to the outer corner post, the connector comprising:

a connecting plate configured to connect the outer plate and the outer corner post of the container body, the connecting plate including a strengthening stop plate located at an inner side of a middle portion of the connecting plate, the strengthening stop plate being substantially perpendicular to the middle portion of the connecting plate, the connecting plate further including a stop groove located at an outer side of the middle portion of the connecting plate and having a first side configured to receive an edge of the outer plate of the container body, the stop groove being substantially perpendicular to the middle portion of the connecting plate, and the connecting plate further including a seat plate substantially parallel to a base plate of the stop groove, the seat plate located at the outer side of the connecting plate, and the connecting plate including first and second clipping strips, the first clipping strip located on a second side of the stop groove, the second side being located opposite the first side, and the second clipping strip being located on the seat plate and extending toward the first clipping strip; and a cover plate with two elastic clipping strips which are configured to respectively engage with the two clipping strips, and the two elastic clipping strips each having a hook-shape cross section.

2. The container body according to claim 1, wherein the strengthening stop plate has an L-shape cross section.

3. The container body according to claim 1, wherein the connecting plate includes a strengthening rib at the end of the connecting plate that is located proximate the outer plate.

4. The container body according to claim 1, wherein the cover plate and the connecting plate cooperatively form an enclosure when the cover plate is attached to the connecting plate.

5. The container body according to claim 4, wherein a first side of the enclosure comprises the base plate, and a second side of the enclosure comprises the seat plate.

6. The container body as recited in claim 1, wherein the connector is attached to the outer corner post and the outer plate with respective first and second rivets.

7. The container body as recited in claim 6, wherein the cover plate and the connecting plate cooperatively form an enclosure within which part of the first rivet is hidden.

8. The container body as recited in claim 7, wherein the enclosure is adjacent to the stop groove.

9. The container body as recited in claim 1, wherein an edge of the outer plate resides in the stop groove when the connector is attached to the outer plate.

10. The container body as recited in claim 1, further comprising foam disposed between a top of the strengthening stop plate and the inner plate.

* * * * *